United States Patent
Jacek et al.

(10) Patent No.: US 12,043,002 B2
(45) Date of Patent: Jul. 23, 2024

(54) ACOUSTIC PANELS AND METHODS FOR PREPARING THEM

(71) Applicant: CertainTeed Ceilings Corporation, Malvern, PA (US)

(72) Inventors: Steven Jacek, Boylston, MA (US); Sizhu You, Auburndale, MA (US); Matthew Gacek, Rutland, MA (US); Michael J. Lembo, Souderton, PA (US)

(73) Assignee: CertainTeed Ceilings Corporation, Malvern, PA (US)

( * ) Notice: Subject to any disclaimer, the term of this patent is extended or adjusted under 35 U.S.C. 154(b) by 0 days.

(21) Appl. No.: 17/897,517

(22) Filed: Aug. 29, 2022

(65) Prior Publication Data

US 2023/0064161 A1    Mar. 2, 2023

Related U.S. Application Data

(63) Continuation of application No. 16/514,484, filed on Jul. 17, 2019, now Pat. No. 11,426,758.

(Continued)

(51) Int. Cl.
*B29C 70/30*    (2006.01)
*B05D 1/02*    (2006.01)
(Continued)

(52) U.S. Cl.
CPC ............ *B29C 70/305* (2013.01); *B05D 1/02* (2013.01); *B29C 70/88* (2013.01); *E04B 1/86* (2013.01);
(Continued)

(58) Field of Classification Search
None
See application file for complete search history.

(56) References Cited

U.S. PATENT DOCUMENTS

| | | | | |
|---|---|---|---|---|
| 3,685,235 A | * | 8/1972 | Lang | .................... E04B 9/02 |
| | | | | 52/39 |
| 4,504,602 A | * | 3/1985 | O'Connell | .............. C04B 26/28 |
| | | | | 521/85 |

(Continued)

FOREIGN PATENT DOCUMENTS

| | | |
|---|---|---|
| EP | 1396509 A1 | 3/2004 |
| WO | 2017042372 A1 | 3/2017 |

OTHER PUBLICATIONS

International Search Report and Written Opinion in International Patent Application No. PCT/US2019/042210, dated Nov. 6, 2019.

*Primary Examiner* — Michael P. Rodriguez
(74) *Attorney, Agent, or Firm* — McDonnell Boehnen Hulbert & Berghoff LLP (57) ABSTRACT

The disclosure relates to acoustic panels and methods for preparing them. The disclosure relates more particularly to panels having a nonwoven facing and to methods for making such panels. One aspect of the disclosure is a method for preparing an acoustic panel comprising providing a base structure. The base structure has one or more edges, an outward major surface having a total area, and an inward major surface opposing the outward major surface. The base structure has a noise reduction coefficient (NRC) of at least about 0.3. The method includes disposing directly against the outward major surface of the base structure a sprayable mixture comprising a plurality of fibers, one or more binders, and a dispersive medium. The method includes drying the disposed mixture to provide a facing layer disposed on the outward major surface of the base structure, the facing layer having an exterior major surface opposing the outward major surface of the base structure.

21 Claims, 2 Drawing Sheets

Related U.S. Application Data

(60) Provisional application No. 62/699,565, filed on Jul. 17, 2018.

(51) Int. Cl.
 *B29C 70/88* (2006.01)
 *E04B 1/86* (2006.01)
 *G10K 11/168* (2006.01)
 *E04B 1/84* (2006.01)

(52) U.S. Cl.
 CPC .... *G10K 11/168* (2013.01); *E04B 2001/8461* (2013.01); *E04B 2001/848* (2013.01)

(56) References Cited

U.S. PATENT DOCUMENTS

| | | | |
|---|---|---|---|
| 5,874,161 A * | 2/1999 | Pape | E04B 1/86 |
| | | | 428/206 |
| 6,613,424 B1 | 9/2003 | Putt | |
| 8,684,134 B2 * | 4/2014 | Dugan | E04C 2/043 |
| | | | 181/290 |
| 11,426,758 B2 | 8/2022 | Jacek | |
| 2002/0139611 A1 | 10/2002 | Baig | |
| 2003/0041987 A1 | 3/2003 | Foster | |
| 2005/0211500 A1 | 9/2005 | Wendt | |
| 2007/0160822 A1 | 7/2007 | Bristow | |
| 2008/0216936 A1 | 9/2008 | Baig | |
| 2009/0173570 A1 | 7/2009 | Levit | |
| 2010/0066121 A1 | 3/2010 | Gross | |
| 2014/0000981 A1 * | 1/2014 | Silfverhuth | E04B 1/82 |
| | | | 428/313.5 |

* cited by examiner

ACOUSTIC PANELS AND METHODS FOR PREPARING THEM

CROSS-REFERENCE TO RELATED APPLICATIONS

This application is a continuation of U.S. patent application Ser. No. 16/514,484, filed Jul. 17, 2019, which claims the benefit of priority of U.S. Provisional Patent Application No. 62/699,565, filed Jul. 17, 2019, each of which is hereby incorporated herein by reference in its entirety.

BACKGROUND OF THE DISCLOSURE

Field of the Disclosure

The disclosure generally relates to acoustic panels and methods for preparing them. The disclosure relates more particularly to panels having a nonwoven facing and to methods for making such panels.

Description of Related Art

Acoustic panels are useful in a number of applications to attenuate noise. For example, an interior ceiling structure can include a system of sound absorbing panels installed on a metal grid. The grid is suspended below a structural ceiling of a room to create a plenum, or air space, between the rear surface of the panels and the ceiling. The front sides of the panels are viewed from below as a dropped ceiling of the room.

Acoustic panels suitable for a ceiling structure typically comprise a lightweight material such as mineral wool, gypsum, foam, wood fiber, paper, cellulose fiber, wet-laid felt, or fiberglass. The panels can be perforated to achieve a desired acoustic absorbency. Perforating opens the plane surface and the internal structure of the acoustic panel to allow air and sound waves to move in and out of the panel.

The physical features of conventional acoustic panels such as, for example, porous fiberglass panels or perforated mineral wool panels, are typically visible, for example, when viewed from below as part of a dropped ceiling of a room. Conventional methods for obscuring the physical features of acoustic panels involve laminating a facing onto the panel, but such methods are limited, in large part because most coverings decrease the acoustic performance of the panel. Moreover, conventional facings are not cost-effective. For example, in the case of a conventional glass mat facing for an acoustic panel, the facing is formed with an expensive formaldehyde-free binder, the lamination process is itself costly, and the weight and fragility of the panels after lamination increases.

Accordingly, there remains a need for a lightweight acoustic panel having an acoustically transparent facing, and for a simple, cost-effective method for preparing such panels.

SUMMARY OF THE DISCLOSURE

In one aspect, the present disclosure provides a method for preparing an acoustic panel comprising
providing a base structure having one or more edges, an outward major surface having a total area, and an inward major surface opposing the outward major surface, the base structure having independently a noise reduction coefficient (NRC) of at least about 0.3; and
disposing directly against the outward major surface of the base structure a sprayable mixture comprising
a plurality of fibers;
one or more binders; and
a dispersive medium; and
drying the disposed mixture to provide a facing layer disposed on the outward major surface of the base structure, the facing layer having an exterior major surface opposing the outward major surface of the base structure.

In another aspect, the present disclosure provides an acoustic panel made by the method of the disclosure.

In another aspect, the present disclosure provides an acoustic panel comprising:
a base structure having one or more edges, an outward major surface having a total area, and an inward major surface opposing the outward major surface, the base structure having independently an NRC of at least about 0.3; and
a facing layer directly disposed on the outward major surface of the base structure, the facing layer comprising a plurality of fibers and one or more binders, the facing layer having an exterior major surface opposing the outward major surface of the base structure.

In another aspect, the present disclosure provides a panel system comprising:
a plurality of support beams arranged in a support grid so as to form a plurality of grid openings in the support grid; and
a plurality of panels respectively aligned with the openings of the support grid, the plurality of panels including a first acoustic panel according as described herein, wherein the first acoustic panel is oriented such that the exterior major surface of the facing layer is facing an interior space adjacent to the support grid.

Other aspects of the disclosure will be apparent to the person of ordinary skill in the art based on the drawings and detailed description below.

DETAILED DESCRIPTION OF THE DISCLOSURE

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice. Thus, before the disclosed processes and devices are described, it is to be understood that the aspects described herein are not limited to specific embodiments, apparatuses, or configurations, and as such can, of course, vary. It is also to be understood that the terminology used herein is for the purpose of describing particular aspects only and, unless specifically defined herein, is not intended to be limiting.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All methods described herein can be performed in any suitable order of steps unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e., denoting somewhat more or somewhat less than the stated value or range, e.g., to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

As the person of ordinary skill in the art will appreciate, directions such as "vertical," "horizontal," "upper" and "lower" are defined relative to how the support member is to be installed, with the ceiling defined as "up."

Furthermore, numerous references have been made to patents and printed publications throughout this specification. Each of the cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

In various aspects and embodiments, the disclosure relates to a method for preparing an acoustic panel. The disclosure demonstrates such methods to efficiently provide relatively inexpensive and lightweight acoustic panels having a facing layer that is transparent to sound and obscuring of a base structure. One aspect of the disclosure is a method for preparing an acoustic panel comprising providing a base structure. The base structure has one or more edges, an outward major surface having a total area, and an inward major surface opposing the outward major surface. The base structure has independently a noise reduction coefficient (NRC) of at least about 0.3. The method includes disposing directly against the outward major surface of the base structure a sprayable mixture comprising a plurality of fibers, one or more binders, and a dispersive medium. The method includes drying the disposed mixture to provide a facing layer disposed on the outward major surface of the base structure, the facing layer having an exterior major surface opposing the outward major surface of the base structure. The inventors have determined that the method provides a relatively lightweight facing layer without requiring separate facing layer formation and lamination steps.

Figure 1:
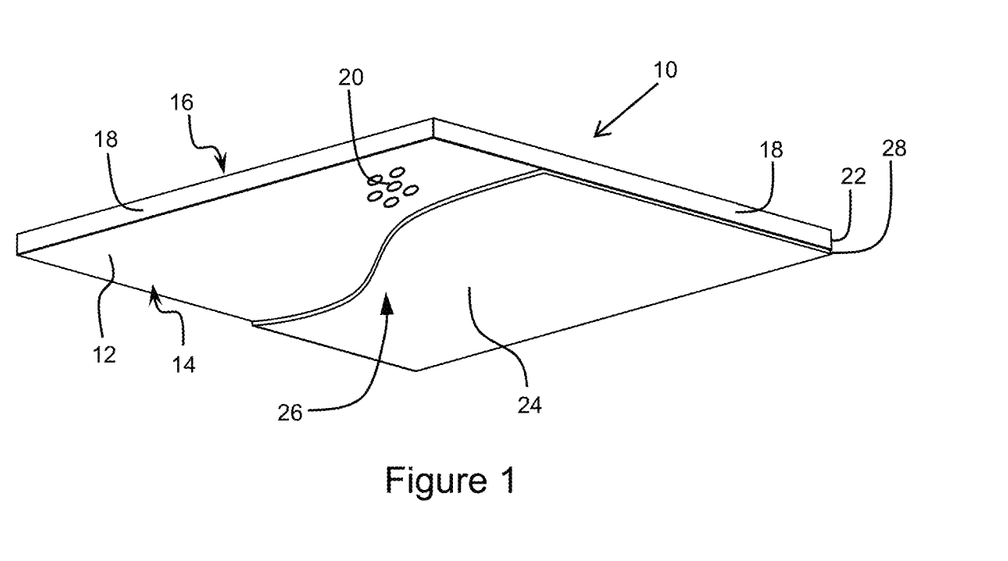
FIG. 1 is an image of an acoustic panel comprising a facing layer according to one embodiment of the disclosure.

One embodiment of the disclosure is shown in schematic view in FIG. 1. A primary component of the panel 10 is a base structure 12. The base structure 12 has an outward major surface 14, an inward major surface 16, and edges 18. In certain embodiments as otherwise described herein, the base structure comprises one or more of mineral wool, fiberglass, gypsum, wood fiber, paper, cellulose fiber, wet-laid felt, and foam. In certain such embodiments, the base structure comprises one or more fillers, and one or more binders. For example, in certain embodiments as otherwise described herein, the mineral wool, fiberglass, gypsum, wood fiber, paper, cellulose fiber, wet-laid felt, and/or foam, and the one or more fillers and one or more binders are present in the base structure in a combined amount of at least 85 wt. %, or at least about 90 wt. %, or at least about 95 wt. %, or at least about 97.5%, or at least about 99 wt. %, or at least about 99.5 wt. %. In certain embodiments as otherwise described herein, the base structure comprises mineral wool. The person of ordinary skill in the art will appreciate that a number of fillers suitable for a base structure (e.g., a base structure comprising mineral wool) are known in the art. For example, in certain embodiments as otherwise described herein, the base structure comprises one or more fillers selected from dolomite, wollastonite, saw dust, fly ash, recycled plastic, rubber crumb, gypsum, glass, perlite, wood pulp (i.e., cellulose), recycled paper, and recycled glass. The person of ordinary skill in the art will further appreciate that a number of binders suitable for a base structure (e.g., a base structure comprising mineral wool) are known in the art. For example, in certain embodiments as otherwise described herein, the base structure comprises one or more binders selected from urea-formaldehyde resin, phenolic resin, polyurethane, polyacrylates, polystyrene, styrene-acrylate copolymers, styrene-butadiene copolymers (i.e., styrene-butadiene rubber, SBR), styrene-butadiene-styrene block copolymer (SBS), styrene-ethylene-butadiene-styrene block copolymer (SEBS), poly(vinyl acetate) (PVAc), poly(vinyl alcohol) (PVA), poly(ethylene-vinyl acetate) (EVA), silicone, nylon, acetal, polyethylene oxide, acrylic resin, and starch.

In certain embodiments as otherwise described herein, the base structure does not comprise perforations. For example, in certain such embodiments, the base structure has one or more physical properties (e.g., porosity) that provide desirable acoustic properties.

In other embodiments, the base structure comprises a plurality of perforations extending from the outward major surface towards the inward major surface, the plurality of perforations occupying an area of the outward major surface. As used herein, the shape of a perforation at its opening may be elongated (e.g., may have an aspect ratio of 2, or 3, or 4, or 5, etc.), or may be annular (e.g., circular). In certain embodiments as otherwise described herein, the perforations have an average depth of less than about 4 mm. For example, in certain such embodiments, the perforations have an average depth within the range of about 2 mm to about 4 mm. In other embodiments, the perforations have an average depth of at least about 4 mm. For example, in certain such embodiments, the perforations have an average depth within the range of about 4 mm to about 12 mm. The person of ordinary skill in the art will appreciate that, in some aspects, perforations as used herein, having an elongated opening and an average depth of less than about 4 mm are also known in the art as "fissures."

Base structure 12 comprises a plurality of perforations 20 (shown in part in FIG. 1). In certain embodiments as otherwise described herein, the plurality of perforations occupies an area of the outward major surface that is within the range of about 0.1% to about 10% of the total area of the outward major surface of base structure 12. For example, in certain embodiments as otherwise described herein, the perforations occupy an area of the outward major surface within the range of about 0.1% to about 9%, or about 0.1% to about 8%, or about 0.1% to about 7%, or about 0.1% to about 6%, or about 0.1% to about 5%, or about 0.1% to about 4%, or about 0.25% to about 10%, or about 0.5% to about 10%, or about 0.75% to about 10%, or about 1% to about 10%, or about 1.5% to about 10%, or about 2% to about 10%, or about 2.5% to about 10%, or about 3% to about 10%, or about 4% to about 10%, or about 5% to about 10%, or about 6% to about 10%, or about 7% to about 10%, or about 0.25% to about 9%, or about 0.5% to about 8%, or about 0.75% to about 7%, or about 1% to about 6%, or about 1.5% to about 5% of the total area of the outward major surface.

In certain embodiments as otherwise described herein, the perforations have an average depth of at least about 4 mm, such as an average depth within the range of about 4 mm to about 12 mm, or about 5 mm to about 10 mm. In certain embodiments as otherwise described herein, the plurality of perforations are annular, and the perforations have an average diameter within the range of about 0.25 mm to about 5 mm. For example, in certain such embodiments, the average diameter of the perforations is within the range of about 0.25 mm to about 4.5 mm, or about 0.25 mm to about 4 mm, or about 0.25 mm to about 3.5 mm, or about 0.25 mm to about 3 mm, or about 0.25 mm to about 2.5 mm, or about 0.25 mm to about 2 mm, or about 0.25 mm to about 1.5 mm, or about 0.5 mm to about 5 mm, or about 0.75 mm to about 5 mm, or about 1 mm to about 5 mm, or about 1.25 mm to about 5 mm, or about 1.5 mm to about 5 mm, or about 2 mm to about 5 mm, or about 2.5 mm to about 5 mm, or about 3 mm to about 5 mm, or about 3.5 mm to about 5 mm, or about 0.5 mm to about 4 mm, or about 0.5 mm to about 3.5 mm, or about 0.5 mm to about 3 mm, or about 0.75 mm to about 2.5 mm, or about 1 mm to about 2.5 mm.

Base structure 12 has a thickness 22. In certain embodiments as otherwise described herein, the base structure has a thickness within the range of about 2 mm to about 50 mm. For example, in certain such embodiments, the thickness of the base structure is within the range of about 2 mm to about 45 mm, or about 2 mm to about 40 mm, or about 2 mm to about 35 mm, or about 2 mm to about 30 mm, or about 2 mm to about 25 mm, or about 2 mm to about 20 mm, or about 2 mm to about 17.5 mm, or about 2 mm to about 15 mm, or about 2 mm to about 10 mm, or about 3 mm to about 50 mm, or about 4 mm to about 50 mm, or about 5 mm to about 50 mm, or about 6 mm to about 50 mm, or about 7 mm to about 50 mm, or about 8 mm to about 50 mm, or about 9 mm to about 50 mm, or about 10 mm to about 50 mm, or about 12.5 mm to about 50 mm, or about 15 mm to about 50 mm, or about 17.5 mm to about 50 mm, or about 20 mm to about 50 mm, or about 3 mm to about 45 mm, or about 3 mm to about 40 mm, or about 4 mm to about 35 mm, or about 5 mm to about 30 mm, or about 5 mm to about 25 mm, or about 5 mm to about 20 mm.

In certain embodiments as otherwise described herein, a width of the acoustic panel is within the range of about 12 to about 60 inches, e.g., from 23 to 25 inches or from 46 to 50 inches, and a length of the acoustic panel is within the range of about 12 to about 144 inches, e.g., from 23 to 25 inches or from 46 to 50 inches.

The person of ordinary skill in the art will appreciate that base structure 12 will have certain acoustic properties. In some aspects, base structure 12 has a characteristic noise reduction coefficient (NRC) of at least about 0.3. As used herein, a "noise reduction coefficient" or "NRC" describes the arithmetic average (e.g., rounded to the nearest multiple of 0.05), of the absorption coefficients for a specific panel determined at 250 Hz, 500 Hz, 1000 Hz, and 2000 Hz. The person of ordinary skill in the art will appreciate that an "absorption coefficient" of a panel may be determined through standardized testing procedures such as, for example, ASTM C423 ("Standard Test Method for Sound Absorption and Sound Absorption Coefficients by the Reverberation Room Method"). The person of ordinary skill in the art will further appreciate that, while intended to describe the fraction of randomly incident sound power absorbed by a surface, an absorption coefficient is defined operationally, and accordingly, highly absorptive panels can have an absorption coefficient exceeding unity at one or more frequencies.

In certain embodiments as otherwise described herein, the base structure has independently a noise reduction coefficient of at least about 0.5. For example, in certain embodiments as otherwise described herein, the base structure has independently a noise reduction coefficient of at least about 0.55, e.g., at least about 0.6, or at least about 0.65, or at least about 0.7, or at least about 0.75, or at least about 0.8, or at least about 0.85, or at least about 0.9, or at least about 0.95.

As described above, one aspect of the disclosure is a method for preparing an acoustic panel comprising providing a base structure and disposing directly against the outward major surface of the base structure a sprayable mixture comprising a plurality of fibers, one or more binders, and a dispersive medium. In certain embodiments as otherwise described herein, the fibers are formed of a polymer. For example, in certain such embodiments, the fibers are polyester, polypropylene, polyethylene, polyethylene terephthalate, polylactic acid, cellulose, polyvinyl chloride, or polyamide. In other embodiments as otherwise described herein, the fibers are glass, e.g., borosilicate glass. Natural fibers, e.g., hemp or flax, can also be used.

In certain embodiments as otherwise described herein, the plurality of fibers has an average length within the range of about 0.5 mm to about 15 mm. For example, in certain such embodiments, the fibers have an average length within the range of about 0.5 mm to about 12.5 mm, or about 0.5 mm to about 10 mm, or about 0.5 mm to about 9 mm, or about 0.5 mm to about 8 mm, or about 0.5 mm to about 7 mm, or about 0.5 mm to about 6 mm, or about 0.5 mm to about 5 mm, or about 0.75 mm to about 15 mm, or about 1 mm to about 15 mm, or about 1.5 mm to about 15 mm, or about 2 mm to about 15 mm, or about 3 mm to about 15 mm, or about 4 mm to about 15 mm, or about 5 mm to about 15 mm, or about 6 mm to about 15 mm, or about 7 mm to about 15 mm, or about 8 mm to about 15 mm, or about 9 mm to about 15 mm, or about 10 mm to about 15 mm, or about 0.75 mm to about 12.5 mm, or about 1 mm to about 12.5 mm, or about 1.5 mm to about 10 mm, or about 2 mm to about 10 mm, or about 3 mm to about 9 mm, or about 3 mm to about 8 mm.

In certain embodiments as otherwise described herein, the plurality of fibers has an average linear mass density within the range of about 0.1 denier ("den," or "D") to about 25 D. For example, in certain such embodiments, the fibers have an average linear mass density within the range of about 0.1 D to about 22.5 D, or about 0.1 D to about 20 D, or about 0.1 D to about 17.5 D, or about 0.1 D to about 15 D, or about 0.1 D to about 12.5 D, or about 0.1 D to about 10 D, or about 0.1 D to about 9 D, or about 0.1 D to about 8 D, or about 0.1 D to about 7 D, or about 0.25 D to about 25 D, or about 0.5 D to about 25 D, or about 1 D to about 25 D, or about 1.5 D to about 25 D, or about 2 D to about 25 D, or about 3 D to about 25 D, or about 4 D to about 25 D, or about 5 D to about 25 D, or about 6 D to about 25 D, or about 7 D to about 25 D, or about 8 D to about 25 D, or about 9 D to about 25 D, or about 10 D to about 25 D, or about 12.5 D to about 25 D, or about 15 D to about 25 D, or about 17.5 D to about 25 D, or about 0.25 D to about 22.5 D, or about 0.25 D to about 20 D, or about 0.5 D to about 17.5 D, or about 0.5 D to about 15 D, or about 0.75 D to about 12.5 D, or about 1 D to about 10 D.

For example, in certain embodiments as otherwise described herein, the sprayable mixture disposed directly against the surface of the base structure comprises a plurality of plastic (e.g., polyester) fibers having an average length within the range of about 0.5 mm to about 15 mm (e.g., about 2 mm to about 10 mm) and an average linear mass density within the range of about 0.1 D to about 25 D (e.g., about 0.5 D to about 15 D).

The amount of the fibers in the sprayable mixture can vary, based in part on the particular equipment and methods used to spray the mixture. In certain embodiments as otherwise described herein, the plurality of fibers is present in the sprayable mixture in an amount within the range of about 0.1 wt. % to about 10 wt. %. For example, in certain such embodiments, the fibers are present in the sprayable mixture in an amount within the range of about 0.1 wt. % to about 9 wt. %, or about 0.1 wt. % to about 8 wt. %, or about or about 0.1 wt. % to about 7 wt. %, or about 0.1 wt. % to about 6 wt. %, or about 0.1 wt. % to about 5 wt. %, or about 0.1 wt. % to about 4.5 wt. %, or about 0.1 wt. % to about 4 wt. %, or about 0.1 wt. % to about 3.5 wt. %, or about 0.1 wt. % to about 3 wt. %, or about 0.25 wt. % to about 10 wt. %, or about 0.5 wt. % to about 10 wt. %, or about 0.75 wt. % to about 10 wt. %, or about 1 wt. % to about 10 wt. %, or about 1.5 wt. % to about 10 wt. %, or about 2 wt. % to about 10 wt. %, or about 2.5 wt. % to about 10 wt. %, or about 3 wt. % to about 10 wt. %, or about 3.5 wt. % to about 10 wt. %, or about 4 wt. % to about 10 wt. %, or about 4.5 wt. % to about 10 wt. %, or about 5 wt. % to about 10 wt. %, or about 6 wt. % to about 10 wt. %, or about 7 wt. % to about 10 wt. %, or about 0.25 wt. % to about 9 wt. %, or about 0.25 wt. % to about 8 wt. %, or about 0.5 wt. % to about 7 wt. %, or about 0.5 wt. % to about 6 wt. %, or about 0.75 wt. % to about 5 wt. %, or about 0.75 wt. % to about 4.5 wt. %, or about 0.75 wt. % to about 4 wt. %. In other embodiments, the fibers are present in the sprayable mixture in an amount within the range of about 1 wt % to about 30 wt %, e.g., about 1 wt % to about 25 wt %, or about 1 wt % to about 20 wt %, or about 1 wt % to about 15 wt %, or about 1 wt % to about 10 wt %, or about 5 wt % to about 30 wt %, or about 5 wt % to about 25 wt %, or about 5 wt % to about 20 wt %, or about 5 wt % to about 15 wt %, or about 10 wt % to about 30 wt %, or about 10 wt % to about 25 wt %, or about 10 wt % to about 20 wt %. The person of ordinary skill in the art will select, based on the present disclosure, an amount of fibers to provide a mixture that is sprayable using a desired type of spraying equipment.

As described above, the sprayable mixture comprises one or more binders. In certain embodiments as otherwise described herein, the one or more binders are selected from a rubber polymer and a plastic polymer. In certain embodiments as otherwise described herein, the mixture comprises a rubber polymer. For example, in certain such embodiments, the rubber polymer is a styrene butadiene copolymer (e.g., a styrene butadiene rubber or a styrene-butadiene-styrene block copolymer). In certain embodiments as otherwise described herein, the mixture comprises a plastic polymer. For example, in certain such embodiments, the plastic polymer is polyacrylic or PVA. But other binders can be used. For example, in certain embodiments, the binder is a starch, e.g., a modified starch. A variety of other types of polymers can be used as the binder, for example, polyurethanes, polyacrylates such as poly(methyl methacrylate), poly(ethyl acrylate), poly(butyl acrylate) and poly(acrylic acid), styrene-acrylate copolymers, styrene-ethylene-butadiene-styrene block copolymer (SEBS), poly(vinyl acetate) (PVAc), poly(ethylene-vinyl acetate) (EVA), ethylene-vinyl chloride copolymers, polystyrene, poly vinyl acetate and poly vinyl alcohol.

In certain embodiments as otherwise described herein, the one or more binders are present in the sprayable mixture in a combined amount within the range of about 0.5 wt. % to about 30 wt. %. For example, in certain such embodiments, the one or more bindings are present in the sprayable mixture in a combined amount within the range of about 0.5 wt. % to about 25 wt. %, or about 0.5 wt. % to about 20 wt. %, or about 0.5 wt. % to about 17.5 wt. %, or about 0.5 wt. % to about 15 wt. %, or about 0.5 wt. % to about 12.5 wt. %, or about 0.5 wt. % to about 10 wt. %, or about 0.5 wt. % to about 9 wt. %, or about 0.5 wt. % to about 8 wt. %, or about 0.5 wt. % to about 7 wt. %, or about 0.75 wt. % to about 30 wt. %, or about 1 wt. % to about 30 wt. %, or about 1.5 wt. % to about 30 wt. %, or about 2 wt. % to about 30 wt. %, or about 3 wt. % to about 30 wt. %, or about 4 wt. % to about 30 wt. %, or about 5 wt. % to about 30 wt. %, or about 7.5 wt. % to about 30 wt. %, or about 10 wt. % to about 30 wt. %, or about 12.5 wt. % to about 30 wt. %, or about 15 wt. % to about 30 wt. %, or about 20 wt. % to about 30 wt. %, or about 0.75 wt. % to about 25 wt. %, or about 0.75 wt. % to about 20 wt. %, or about 1 wt. % to about 17.5 wt. %, or about 1 wt. % to about 15 wt. %, or about 1.5 wt. % to about 12.5 wt. %, or about 1.5 wt. % to about 10 wt. %. Of course, in some embodiments greater amounts of binder can be used. In certain embodiments as otherwise described herein, the one or more binders are present in the sprayable mixture in a combined amount within the range of about 1 wt % to about 50 wt %, e.g., about 1 wt % to about 40 wt %, or about 5 wt % to about 50 wt %, or about 5 wt % to about 40 wt %, or about 10 wt % to about 50 wt %, or about 10 wt % to about 40 wt %, or about 20 wt % to about 50 wt %, or about 20 wt % to about 40 wt %.

As described above, the sprayable mixture comprises a dispersive medium. In certain embodiments as otherwise described herein, the dispersive medium includes water. Desirably, the dispersive medium is based chiefly on water as the liquid, to provide for inexpensive and environmentally-friendly use. In certain embodiments as otherwise described herein, the total amount of water in the sprayable mixture is in the range of about 20 wt % to about 98 wt %, e.g., in the range of about 20 wt % to about 95 wt %, or about 20 wt % to about 90 wt %, or about 20 wt % to about 80 wt %, or about 20 wt % to about 50 wt %, or about 30 wt % to about 98 wt %, or about 30 wt % to about 95 wt %, or about 30 wt % to about 90 wt %, or about 30 wt % to about 80 wt %, or about 30 wt % to about 50 wt %, or about 40 wt % to about 98 wt %, or about 40 wt % to about 95 wt %, or about 40 wt % to about 90 wt %, or about 40 wt % to about 80 wt %, or about 40 wt % to about 60 wt %. In certain embodiments as otherwise described herein, the total amount of water in the sprayable mixture is in the range of about 50 wt % to about 98 wt %, e.g., in range of about 50 wt % to about 95 wt %, or about 50 wt % to about 90 wt %, or about 50 wt % to about 80 wt %, or about 50 wt % to about 70 wt %, or about 60 wt % to about 98 wt %, or about 60 wt % to about 95 wt %, or about 60 wt % to about 90 wt %, or about 60 wt % to about 80 wt %. And in certain embodiments as otherwise described herein, the total amount of water in the sprayable mixture is in the range of about 70 wt % to about 98 wt %, e.g., in the range of about 70 wt % to about 95 wt %, or about 70 wt % to about 90 wt %, or about 70 wt % to about 80 wt %, or about 75 wt % to about 98, or about 75 wt % to about 95 wt %, or about 75 wt % to about 90 wt %, or about 75 wt % to about 85 wt %, or about 80 wt % to about 98 wt %, or about 80 wt % to about 95 wt %, or about 80 wt % to about 90 wt %, or about 85 wt % to about 98 wt %, or about 85 wt % to about 95 wt %, or about 90 wt % to about 98 wt %.

In certain embodiments as otherwise described herein, the dispersive medium comprises water and one or more of a viscosity modifier and a dispersant. In certain embodiments as otherwise described herein, the one or more of a viscosity modifier and a dispersant are present in the dispersive medium in a combined amount within the range of about 0.1 wt. % to about 15 wt. %. For example, in certain such embodiments, the one or more of a viscosity modifier and a dispersant are present in the dispersive medium in a combined about within the range of about 0.1 wt. % to about 12.5 wt. %, or about 0.1 wt. % to about 10 wt. %, or about 0.1 wt. % to about 9 wt. %, or about 0.1 wt. % to about 8 wt. %, or about 0.1 wt. % to about 7 wt. %, or about 0.1 wt. % to about 6 wt. %, or about 0.1 wt. % to about 5 wt. %, or about 0.25 wt. % to about 15 wt. %, or about 0.5 wt. % to about 15 wt. %, or about 0.75 wt. % to about 15 wt. %, or about 1 wt. % to about 15 wt. %, or about 2 wt. % to about 15 wt. %, or about 3 wt. % to about 15 wt. %, or about 4 wt. % to about 15 wt. %, or about 5 wt. % to about 15 wt. %, or about 7.5 wt. % to about 15 wt. %, or about 10 wt. % to about 15 wt. %, or about 0.25 wt. % to about 12.5 wt. %, or about 0.25 wt. % to about 10 wt. %, or about 0.5 wt. % to about 9 wt. %, or about 0.5 wt. % to about 8 wt. %. In certain embodiments as otherwise described herein, water is present in the dispersive medium in an amount within the range of about 85 wt. % to about 99 wt. %. For example, in certain such embodiments, water is present in the dispersive medium in an amount within the range of about 85 wt. % to about 97.5 wt. %, or about 85 wt. % to about 95 wt. %, or about 85 wt. % to about 92.5 wt. %, or about 85 wt. % to about 90 wt. %, or about 87.5 wt. % to about 99 wt. %, or about 90 wt. % to about 99 wt. %, or about 92.5 wt. % to about 99 wt. %, or about 95 wt. % to about 99 wt. %, or about 87.5 wt. % to about 95 wt. %, or about 90 wt. % to about 97.5 wt. %, or about 92.5 wt. % to about 99 wt. %.

In certain embodiments as otherwise described herein, the dispersive medium comprises a viscosity modifier. In certain such embodiments, the viscosity modifier is an anionic or cationic flocculant. In certain embodiments as otherwise described herein, the dispersive medium comprises a dispersant. In certain such embodiments, the dispersant is an alkyl amine. The person of ordinary skill in the art will appreciate that a number of dispersants suitable for the dispersive medium, such as amphiphilic and/or ionic compounds, are known in the art.

In certain embodiments as otherwise described herein, the total amount of water, viscosity modifiers (e.g., an anionic or cation flocculant), and dispersants (e.g., an alkyl amine) is at least about 85 wt. % of the dispersive medium. For example, in certain embodiments as otherwise described herein, the total amount of water, viscosity modifiers, and dispersants is at least about 87.5 wt. %, or at least about 90 wt. %, or at least about 92.5 wt. %, or at least about 95 wt. %, or at least about 97.5 wt. %, or at least about 98 wt. %, or at least about 99 wt. %, or at least 99.5 wt. % of the dispersive medium.

In certain embodiments as otherwise described herein, the sprayable mixture further comprises a pigment. For example, in certain embodiments as otherwise described herein, the sprayable mixture comprises titanium dioxide, zinc oxide, or carbon black. Other common pigments suitable in the sprayable mixture include, for example, transition metal and metal oxide pigments (e.g., iron oxides), anthraquinoids, quinacridone, phthalocyanines, ultramarines, nepheline syenite, barium sulfate, aluminum trihydrate, and magnesium oxide. In certain embodiments as otherwise described herein, the pigment is present in the sprayable mixture in an amount within the range of about 0.01 wt. % to about 10 wt. % of the of the sprayable mixture. For example, in certain such embodiments, the pigment is present in the sprayable mixture in an amount within the range of about 0.01 wt. % to about 9 wt. %, or about 0.01 wt. % to about 8 wt. %, or about 0.01 wt. % to about 7 wt. %, or about 0.01 wt. % to about 6 wt. %, or about 0.01 wt. % to about 5 wt. %, or about 0.01 wt. % to about 4.5 wt. %, or about 0.01 wt. % to about 4 wt. %, or about 0.01 wt. % to about 3.5 wt. %, or about 0.01 wt. % to about 3 wt. %, or about 0.01 wt. % to about 2.5 wt. %, or about 0.05 wt. % to about 10 wt. %, or about 0.1 wt. % to about 10 wt. %, or about 0.25 wt. % to about 10 wt. %, or about 0.5 wt. % to about 10 wt. %, or about 1 wt. % to about 10 wt. %, or about 1.5 wt. % to about 10 wt. %, or about 2 wt. % to about 10 wt. %, or about 2.5 wt. % to about 10 wt. %, or about 3 wt. % to about 10 wt. %, or about 4 wt. % to about 10 wt. %, or about 5 wt. % to about 10 wt. %, or about 0.05 wt. % to about 9 wt. %, or about 0.1 wt. % to about 8 wt. %, or about 0.25 wt. % to about 7 wt. %, or about 0.5 wt. % to about 6 wt. %, or about 1 wt. % to about 5 wt. %. In certain embodiments as otherwise described herein, the fibers of the sprayable mixture (e.g., polyester fibers) comprise the pigment of the sprayable mixture (e.g., titanium dioxide), for example, in an amount of about 0.1 wt. %, or 0.25 wt. %, or 0.5 wt. %, or 0.75 wt. %, or 1 wt. % of the fibers.

For example, in certain embodiments as otherwise described herein, the sprayable mixture comprises a plurality of polymer (e.g., polyester) fibers having an average length within the range of about 0.5 mm to about 15 mm (e.g., about 0.5 mm to about 12.5 mm, or about 2 mm to about 10 mm) and an average linear mass density within the range of about 0.1 D to about 25 D (e.g., about 0.1 D to about 20 D, or about 0.5 D to about 15 D), present in the sprayable mixture in an amount within the range of about 0.1 wt. % to about 25 wt. % (e.g., about 0.1 wt % to about 10 wt %, or about 0.1 wt. % to about 8 wt. %, or about 0.5 wt. % to about 6 wt. %). In certain such embodiments, the sprayable mixture further comprises a polyacrylic or poly(vinyl alcohol) (PVA) binder, present in the sprayable mixture in an amount within the range of about 0.5 wt. % to about 50 wt. % (e.g., about 0.5 wt % to about 30 wt %, or about 0.5 wt. % to about 25 wt. %, or about 1 wt. % to about 15 wt. %). In certain such embodiments, the sprayable mixture further comprises a titanium dioxide pigment, present in the sprayable mixture in an amount within the range of about 0.01 wt. % to about 10 wt. % (e.g., about 0.01 wt. % to about 8 wt. %, or about 0.5 wt. % to about 6 wt. %). In certain such embodiments, the sprayable mixture further comprises a dispersive medium, present in the sprayable mixture in an amount within the range of about 80 wt. % to about 99 wt. %, comprising one or more of a viscosity modifier (e.g., an anionic or cationic flocculant) and a dispersant (e.g., an alkyl amine), present in the dispersive medium in a combined about within the range of about 0.1 wt. % to about 15 wt. %, and water, present in the dispersive medium in an amount within the range of about 85 wt. % to about 99 wt. %.

In certain embodiments as otherwise described herein, the total amount of the binders, fibers, dispersive medium, and pigment is at least about 85 wt. % of the sprayable mixture. For example, in certain embodiments as otherwise described herein, the total amount of the binder, fibers, dispersive medium, and pigment is at least about 87.5 wt. %, or at least about 90 wt. %, or at least about 92.5 wt. %, or at least about 95 wt. %, or at least about 97.5 wt. %, or at least about 98 wt. %, or at least about 99 wt. %, or at least about 99.5 wt. % of the sprayable mixture.

As described above, one aspect of the disclosure is a method for preparing an acoustic panel comprising disposing directly against the outward major surface of a base structure a sprayable mixture, and drying the disposed mixture to provide a facing layer. In certain embodiments as otherwise described herein, the method further comprises applying a paint to the outward major surface of the base structure before disposing the sprayable mixture directly against the outward major surface. As used herein, the term "paint" describes curable liquids comprising a pigment (e.g., titanium dioxide), a binder (e.g., acrylic polymer or styrene butadiene rubber), and a solvent (e.g., water). The person of ordinary skill in the art will appreciate that applying a paint typically comprises brushing or spraying a thin coating of paint onto a surface, and allowing the coating to dry and/or cure.

In certain embodiments as otherwise described herein, the coat weight of the disposed mixture before drying is within the range of about 25 $g/m^2$ to about 750 $g/m^2$. For example, in certain embodiments as otherwise described herein, the coat weight of the disposed mixture before drying is within the range of about 25 $g/m^2$ to about 650 $g/m^2$, or about 25 $g/m^2$ to about 550 $g/m^2$, or about 25 g/m to about 450 $g/m^2$, or about 25 $g/m^2$ to about 350 $g/m^2$, or about 25 $g/m^2$ to about 250 g/m², or about 25 g/m² to about 200 g/m², or about 25 g/m² to about 150 g/m², or about 50 g/m² to about 750 g/m², or about 75 g/m² to about 750 g/m², or about 100 g/m² to about 750 g/m², or about 150 g/m² to about 750 g/m², or about 200 g/m² to about 750 g/m², or about 300 g/m² to about 750 g/m², or about 400 g/m² to about 750 g/m², or about 50 g/m² to about 650 g/m², or about 50 g/m² to about 550 g/m², or about 50 g/m² to about 450 g/m², or about 50 g/m² to about 350 g/m², or about 75 g/m² to about 300 g/m². But in certain embodiments, e.g., when the fibers are glass fibers, higher coat weights can be used. For example, in certain embodiments as otherwise described herein, the coat weight of the disposed mixture before drying is within the range of about 25 g/m² to about 6000 g/m², e.g., about 25 g/m² to about 4000 g/m², or about 25 g/m² to about 2500 g/m², or about 25 g/m² to about 1500 g/m², or about 100 g/m² to about 6000 g/m², or about 100 g/m² to about 4000 g/m², or about 100 g/m² to about 2500 g/m², or about 100 g/m² to about 1500 g/m², or about 500 g/m² to about 6000 g/m², or about 500 g/m² to about 4000 g/m², or about 500 g/m² to about 2500 g/m², or about 500 g/m² to about 1500 g/m², or about 1000 g/m² to about 6000 g/m², or about 1000 g/m² to about 4000 g/m², or about 1000 g/m² to about 2500 g/m².

The person of ordinary skill in the art will appreciate that the sprayable mixture can be disposed directly against the outward major surface of the base structure using any of a variety of spraying means known in the art. For example, in certain embodiments as otherwise described herein, disposing the sprayable mixture comprises spraying the composition onto the outward major surface of the base structure with a texture sprayer or a hopper gun. The person of ordinary skill in the art will appreciate that a variety of other spraying equipment can be used, and will select appropriate spraying equipment, based on the disclosure herein, in view of the spraying area, desired coating properties, and composition to be sprayed. The present inventors have determined that, advantageously, the mixture as otherwise described herein can remain sprayable (e.g., facilitating spray breakup, and avoiding clogging) while maintaining in suspension a relatively high loading of fibers.

In certain embodiments as otherwise described herein, the disposed mixture is dried at a temperature within the range of about 50° C. to about 200° C. For example, in certain embodiments as otherwise described herein, the disposed mixture is dried at a temperature within the range of about 50° C. to about 175° C., or about 50° C. to about 150° C., or about 50° C. to about 125° C., or about 75° C. to about 200° C., or about 100° C. to about 200° C., or about 125° C. to about 200° C., or about 75° C. to about 175° C., or about 75° C. to about 150° C. In certain embodiments as otherwise described herein, the method further comprises applying a paint to the exterior major surface of the facing layer after drying the disposed mixture.

Another aspect of the disclosure is an acoustic panel. One embodiment of the disclosure is shown in schematic view in FIG. 1. The panel includes a base structure 12 having one or more edges 18, an outward major surface 14 having a total area, and an inward major surface 16 opposing the outward major surface. The base structure has independently a noise reduction coefficient (NRC) of at least about 0.3. The panel further includes a facing layer 24 directly disposed on the outward major surface of the base structure, the facing layer having an exterior major surface 26 opposing the outward major surface of the base structure. The facing layer 24 comprises a plurality of fibers and one or more binders. In certain embodiments, the acoustic panel is made by any method as described herein.

In certain embodiments as otherwise described herein, the base structure does not comprise perforations. For example, in certain such embodiments, the base structure has one or more physical properties (e.g., porosity) that provide desirable acoustic properties.

In other embodiments, the base structure comprises a plurality of perforations extending from the outward major surface towards the inward major surface, the plurality of perforations occupying an area of the outward major surface. For example, base structure 12 comprises a plurality of perforations 20 (shown in part in FIG. 1). In certain embodiments as otherwise described herein, the plurality of perforations occupies an area of the outward major surface that is within the range of about 0.1% to about 10% of the total area of the outward major surface of base structure 12.

The person of ordinary skill in the art will appreciate that facing layer 24, comprising a plurality of fibers and one or more binders, will have certain optical properties. In some aspects, facing layer 24 can have a characteristic light scattering percentage. In certain embodiments as otherwise described herein, the facing layer is substantially scattering for light in the wavelength range of 400 nm to 700 nm. For example, in certain such embodiments, the facing layer has a light scattering percentage of at least about 50%, or at least about 55%, or at least about 60%, or at least about 65%, or at least about 70%, or at least about 75%, or at least about 80%, or at least about 85%, or at least about 90%, or at least about 95%, for a wavelength region of 400 nm to 700 nm.

The person of ordinary skill in the art will further appreciate that facing layer 24 will have, independently of the base structure, certain acoustic properties. In some aspects, facing layer 24 can have a characteristic sound absorption coefficient. In certain embodiments as otherwise described herein, the facing layer is substantially transparent to sound. For example, in certain embodiments as otherwise described herein, the facing layer has an absorption coefficient of less than 0.5 for acoustic frequencies in the range of 100 Hz to 10,000 Hz. In certain such embodiments, the facing layer has an absorption coefficient of less than 0.45, or less than 0.4, or less than 0.35, or less than 0.3, or less than 0.25 for acoustic frequencies in the range of 100 Hz to 10,000 Hz. In another example, in certain embodiments as otherwise described herein, the facing layer and the base structure each independently have an air resistivity, and the air resistivity of the facing layer is equal to or less than the air resistivity of the base structure. In certain such embodiments, the air resistivity of the base structure is at least 25%, or at least 50%, or at least 75%, or at least about 100% greater than the air resistivity of the facing layer. In some embodiments, the air resistivity of the facing layer is in a range of about 1 to about 2000 kPa·s/m², or about 10 to about 1000 kPa·s/m², or about 100 to about 500 kPa·s/m².

The person of ordinary skill in the art will further appreciate that panel 10, comprising base structure 12 and facing layer 24, will have certain acoustic properties. In some aspects, panel 10 can have a characteristic noise reduction coefficient. In certain embodiments as otherwise described herein, the acoustic panel has a noise reduction coefficient of at least about 0.3, e.g., at least about 0.35, or at least about 0.4, or at least about 0.45. In certain embodiments as otherwise described herein, the acoustic panel has a noise reduction coefficient of at least about 0.5. For example, in certain embodiments as otherwise described herein, the acoustic panel has a noise reduction coefficient of at least about 0.55, or at least about 0.6, or at least about 0.65, or at least about 0.7, or at least about 0.75, or at least about 0.8, or at least about 0.85, or at least about 0.9, or at least about 0.95. In certain embodiments as otherwise described herein, the noise reduction coefficient of the acoustic panel is at least about 70% of the noise reduction coefficient of the base structure independently. For example, in certain such embodiments, the noise reduction coefficient of the acoustic panel is at least about 75%, or at least about 80%, or at least about 85%, or at least about 90%, or at least about 95% of the noise reduction coefficient of the base structure independently.

Facing layer 24 has a thickness 28. In certain embodiments as otherwise described herein, the thickness of the facing layer is within the range of about 0.25 mm to about 20 mm. For example, in certain such embodiments, the thickness of the facing layer is within the range of about 0.25 mm to about 17.5 mm, or about 0.25 mm to about 15 mm, or about 0.25 mm to about 12.5 mm, or about 0.25 mm to about 10 mm, or about 0.25 mm to about 9 mm, or about 0.25 mm to about 8 mm, or about 0.25 mm to about 7 mm, or about 0.25 mm to about 6 mm, or about 0.25 mm to about 5 mm, or about 0.5 mm to about 20 mm, or about 0.75 mm to about 20 mm, or about 1 mm to about 20 mm, or about 1.5 mm to about 20 mm, or about 2 mm to about 20 mm, or about 3 mm to about 20 mm, or about 4 mm to about 20 mm, or about 5 mm to about 20 mm, or about 7.5 mm to about 20 mm, or about 10 mm to about 20 mm, or about 0.5 mm to about 15 mm, or about 0.5 mm to about 10 mm, or about 0.75 mm to about 9 mm, or about 0.75 mm to about 8 mm, or about 1 mm to about 7 mm, or about 1 mm to about 6 mm, or about 1 mm to about 5 mm.

In certain embodiments as otherwise described herein, the facing layer comprises fibers (e.g., polyester fibers) in an amount within the range of about 10 wt. % to about 50 wt. %. For example, in certain such embodiments, the facing layer comprises fibers in an amount within the range of about 10 wt. % to about 45 wt. %, or about 10 wt. % to about 40 wt. %, or about 10 wt. % to about 35 wt. %, or about 10 wt. % to about 30 wt. %, or about 10 wt. % to about 25 wt. %, or about 15 wt. % to about 50 wt. %, or about 20 wt. % to about 50 wt. %, or about 25 wt. % to about 50 wt. %, or about 30 wt. % to about 50 wt. %, or about 35 wt. % to about 50 wt. %, or about 15 wt. % to about 45 wt. %, or about 15 wt. % to about 40 wt. %, or about 20 wt. % to about 35 wt. %.

In certain embodiments as otherwise described herein, the facing layer comprises binder (e.g., a rubber polymer or a plastic polymer) and pigment (e.g., titanium dioxide) in a combined amount within the range of about 40 wt. % to about 90 wt. %. For example, in certain such embodiments, the facing layer comprises binder and pigment in a combined amount within the range of about 40 wt. % to about 85 wt. %, or about 40 wt. % to about 80 wt. %, or about 40 wt. % to about 75 wt. %, or about 40 wt. % to about 70 wt. %, or about 40 wt. % to about 65 wt. %, or about 40 wt. % to about 60 wt. %, or about 40 wt. % to about 55 wt. %, or about 45 wt. % to about 90 wt. %, or about 50 wt. % to about 90 wt. %, or about 55 wt. % to about 90 wt. %, or about 60 wt. % to about 90 wt. %, or about 65 wt. % to about 90 wt. %, or about 70 wt. % to about 90 wt. %, or about 75 wt. % to about 90 wt. %, or about 50 wt. % to about 85 wt. %, or about 55 wt. % to about 85 wt. %, or about 60 wt. % to about 80 wt. %, or about 65 wt. % to about 80 wt. %.

In certain embodiments as otherwise described herein, the outward major surface of the base structure comprises a localized paint (e.g., provided by applying a paint to the outward major surface of the base structure before disposing the sprayable mixture directly against the outward major surface). In certain such embodiments, the color of the outward major surface is white.

In certain embodiments as otherwise described herein, the outward major surface of the base structure comprises a localized adhesive. However, the present inventors have determined that the acoustic panels as otherwise described herein can be prepared according to methods as otherwise described herein, without the use of a localized adhesive, which can be costly and can negatively affect the acoustic performance of the panel. Accordingly, in certain embodiments, an adhesive is not localized on the outward major surface of the base structure of the acoustic panel as otherwise described herein. In certain such embodiments, neither is a paint localized on the outward major surface of the base structure.

In certain embodiments as otherwise described herein, the exterior major surface of the facing layer comprises a localized paint (e.g., provided by applying a paint to the exterior major surface of the facing layer after drying the sprayable mixture disposed directly against the base structure). In certain such embodiments, the color of the exterior major surface is white.

In certain embodiments as otherwise described herein, the panel is resistant to sagging.

Notably, the methods described herein can be performed to provide acoustic panels in a system that forms an architectural surface. Accordingly, another aspect of the disclosure is a panel system comprising a plurality of support beams arranged in a support grid so as to form a plurality of grid openings in the support grid, and a plurality of panels respectively aligned with the openings of the support grid, where at least one of the panels is an acoustic panel as described herein, or an acoustic panel prepared according to a method described herein. In certain embodiments, each panel of the plurality is oriented such that the exterior major surface of the facing layer is facing an interior space adjacent to the support grid. The person of ordinary skill in the art will appreciate that the perforations of the base structures of each panel will, in such an arrangement, be advantageously obscured by the facing layer while still being accessible to air and sound waves.

EXAMPLES

The Examples that follow are illustrative of specific embodiments of the invention, and various uses thereof. They are set forth for explanatory purposes only, and are not to be taken as limiting the invention.

Example 1. Sprayable Mixture Preparation

Formulation 1: A 2.4% solution of Nalco 7763 viscosity modifier in water was mixed gently at 50° C. for 1 hr. 17.69 g of the 2.4% viscosity modifier solution was added to 71.2 g of DI water, followed by 0.35 g of Nalco 8493 dispersant. While mixing under high shear, 1.86 g of polyester fibers (6-mm average length, 1.5 D average linear mass density, 0.31% $TiO_2$) were slowly added. Then 8.85 g of a 52% solution of a mixture of a styrenated polyacrylic binder and titanium dioxide in water was added while mixing under low shear.

Formulation 2: A 2.4% solution of Nalco 7763 viscosity modifier in water was mixed gently at 50° C. for 1 hr. 17.46 g of the 2.4% viscosity modifier solution was added to 73.37 g of DI water, followed by 0.17 g of Nalco 8493 dispersant.

Then 5.71 g of Wacker Vinnol 4530 (an aqueous, terpolymer dispersion based on the monomers vinyl chloride, ethylene, and a third monomer imparting amide functionality) was added while mixing under low shear. While mixing under high shear, 3.56 g of polyester fibers (6-mm average length, 1.5 D average linear mass density, 0.31% $TiO_2$) were slowly added.

Formulation 3: A 2.4% solution of Nalco 7763 viscosity modifier in water was mixed gently at 50° C. for 1 hr. 17.46 g of the 2.4% viscosity modifier solution was added to 73.37 g of DI water, followed by 0.17 g of Nalco 8493 dispersant. Then 5.71 g of Celanese Dur-O-Cote FF (A non-crosslinking, surfactant protected, vinyl acetate emulsion) was added while mixing under low shear. While mixing under high shear, 3.56 g of polyester fibers (6-mm average length, 1.5 D average linear mass density, 0.31% $TiO_2$) were slowly added.

Formulation 4: A 2.4% solution of Nalco 7763 viscosity modifier in water was mixed gently at 50° C. for 1 hr. 9.23 g of the 2.4% viscosity modifier solution was added to 78.83 g of DI water, followed by 0.19 g of Nalco 8493 dispersant. Then 5.71 g of Wacker Vinnol 4530 (A non-crosslinking, surfactant protected, vinyl acetate emulsion) was added while mixing under low shear. While mixing under high shear, 5.69 g of polyester fibers (6-mm average length, 1.5 D average linear mass density, 0.31% $TiO_2$) were slowly added.

Example 2. Panel Preparation

The mixture of Formulation 1 was sprayed with a hopper gun onto a mineral wool base structure having an NRC of about 0.3 having a 3% total coverage of 1.4-mm perforations, and then dried at about 110° C. for about 5 minutes to provide a facing layer having a thickness of 1.2-5.6 mm. After drying, the NRC of the was about 0.3.

Example 3. Panel Preparation

White paint was applied to a mineral wool base structure having an NRC of about 0.3 having a 3% total coverage of 1.4-mm perforations to provide a paint layer having a thickness of 1-3 mm. After drying the paint, the mixture of Formulation 1 was sprayed with a hopper gun onto the painted mineral wool base structure, and then dried at about 110° C. for about 5 minutes to provide a facing layer having a thickness of 1.2-5.6 mm.

Figure 2A:
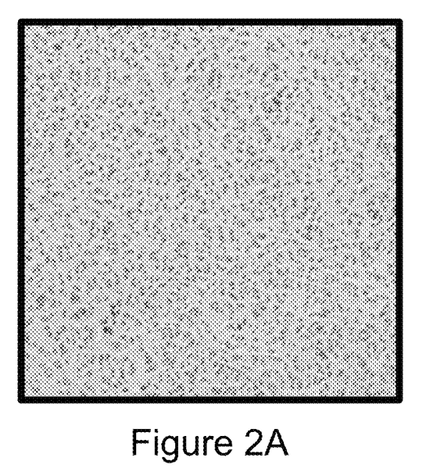
FIG. 2A shows a facing layer according to an embodiment of the disclosure after drying having a paint coating of about 30 g/m$^2$.
Figure 2B:
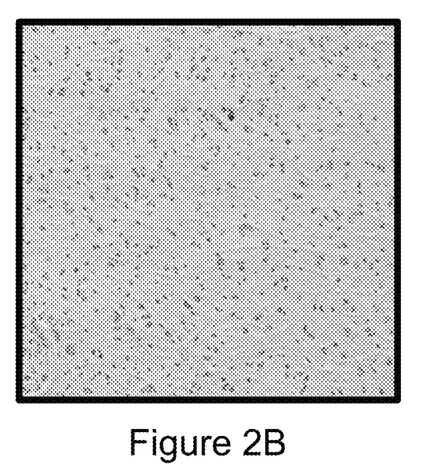
FIG. 2B shows a facing layer according to an embodiment of the disclosure after drying having a paint coating of about 100 g/m$^2$.
Figure 2C:
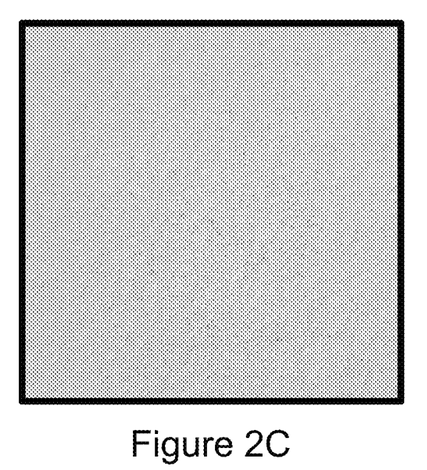
FIG. 2C shows a facing layer according to an embodiment of the disclosure after drying having a paint coating of about 175 g/m$^2$.

After drying, white paint was applied to the facing layer of the panel to provide a layer having a thickness of 1-3 mm, and dried. FIG. 2 shows the results after drying of facing layers having paint coatings of about 30 $g/m^2$ (FIG. 2A), about 100 $g/m^2$ (FIG. 2B), and about 175 $g/m^2$ (FIG. 2C). After drying, the NRC of the panel was about 0.3.

The results show that the mixture could be effectively sprayed onto to a perforated base structure, and that the resulting facing layer obscured the perforated structure without detrimentally affecting the mechanical or acoustical properties of the panel.

Example 4. Sprayability of Formulations

Formulation 2 was supplied from a pressure pot under about 60 psi to a Graco Texture Spray Gun. The formulation was sprayed under this configuration with good atomization and no jamming.

Formulation 2 was supplied from a pressure pot under about 60 psi to a Graco brand external mix spray gun. The formulation jammed under this configuration.

Formulation 2 was supplied from a pressure pot under about 60 psi to a Graco brand high volume low pressure (HVLP) spray gun. The formulation jammed under this configuration.

Formulation 2 was supplied from a peristaltic pump to a Graco Texture Spray Gun. The formulation sprayed initially, but then jammed under this configuration.

Formulation 2 was circulated through a Binks Maple 15 piston pump. The formulation jammed under this configuration.

Formulation 2 was circulated through a Dayton 5UXL7 flexible impeller pump. The formulation flowed reliably with no jamming under this configuration.

Formulation 3 was circulated through a Moyno 34459 progressive cavity pump. The formulation flowed reliably with no jamming under this configuration.

A 5-gallon reservoir of Formulation 3 was connected to a Moyno 34459 progressive cavity pump with flexible tubing. The pump was connected to a Binks Model 21M automatic spray gun with flexible tubing. The output flow from the pump was split between supplying the spray gun and being diverted into a recirculation loop which fed back into the formulation reservoir. The spray gun was supplied with compressed air at 45 psi to open the cylinder, and 50 psi atomization air. The formulation was sprayed under this configuration with good atomization and no jamming.

Formulation 4 was supplied from a pressure pot under about 60 psi to a Graco Texture Spray Gun. The formulation was not continuously sprayable under this configuration.

Additional aspects of the disclosure are provided by the following enumerated embodiments, which can be combined in any number and in any combination that is not logically or technically inconsistent.

Embodiment 1. A method for preparing an acoustic panel comprising
  providing a base structure having one or more edges, an outward major surface having a total area, and an inward major surface opposing the outward major surface, the base structure having independently a noise reduction coefficient (NRC) of at least about 0.3; and
  disposing directly against the outward major surface of the base structure a sprayable mixture comprising
    a plurality of fibers;
    one or more binders; and
    a dispersive medium; and
  drying the disposed mixture to provide a facing layer disposed on the outward major surface of the base structure, the facing layer having an exterior major surface opposing the outward major surface of the base structure.

Embodiment 2. A method according to embodiment 1, wherein the base structure comprises
  one or more of mineral wool, fiberglass, gypsum, wood fiber, paper, cellulose fiber, wet-laid felt, and foam;
  one or more fillers; and
  one or more binders;
  present in the base structure in a combined amount of at least about 85 wt. %, or at least about 95 wt. %, or at least about 97.5 wt. %, or at least about 99 wt. %.

Embodiment 3. A method according to embodiment 2, wherein the base structure comprises mineral wool.

Embodiment 4. A method according to any of embodiments 1-3, wherein the base structure comprises a plurality of perforations extending from the outward major surface towards the inward major surface, the plurality of perforations occupying an area of the outward major surface within the range of about 0.1% to about 10% of the total area of the outward major surface Embodiment 5. A method according to embodiment 4, wherein the perforations occupy an area of the outward major surface within the range of about 0.5% to about 10%, e.g., about 0.5% to about 8%, or about 1% to about 6%.

Embodiment 6. A method according to embodiment 4 or 5, wherein the perforations are round, and the average diameter of the perforations is within the range of about 0.25 mm to about 5 mm, e.g., about 0.25 mm to about 4 mm, or about 0.5 mm to about 3 mm.

Embodiment 7. A method according to any of embodiments 4-6, wherein the average depth of the perforations is at least about 3 mm, e.g., at least about 4 mm, or at least about 5 mm.

Embodiment 8. A method according to any of embodiments 1-7, wherein the base structure has a thickness within the range of about 2 mm to about 50 mm, e.g., about 2 mm to about 35 mm, or about 5 mm to about 25 mm.

Embodiment 9. A method according to any of embodiments 1-8, wherein the base structure has independently a noise reduction coefficient (NRC) of at least about 0.5, e.g., at least about 0.6, or at least about 0.7, or at least about 0.8.

Embodiment 10. A method according to any of embodiments 1-9, wherein the fibers are plastic, e.g., polyester, polypropylene, polyethylene, polyethylene terephthalate, polylactic acid, cellulose, polyvinyl chloride, or polyamide.

Embodiment 11. A method according to any of embodiments 1-9, wherein the fibers are glass, e.g., borosilicate glass, or natural fibers, e.g., flax or hemp.

Embodiment 12. A method according to any of embodiments 1-11, wherein the fibers have an average length within the range of about 0.5 mm to about 12.5 mm, e.g., about 0.5 mm to about 10 mm, or about 0.5 mm to about 9 mm, or about 0.5 mm to about 8 mm, or about 0.5 mm to about 7 mm, or about 0.5 mm to about 6 mm, or about 0.5 mm to about 5 mm, or about 0.75 mm to about 15 mm, or about 1 mm to about 15 mm, or about 1.5 mm to about 15 mm, or about 2 mm to about 15 mm, or about 3 mm to about 15 mm, or about 4 mm to about 15 mm, or about 5 mm to about 15 mm, or about 6 mm to about 15 mm, or about 7 mm to about 15 mm, or about 8 mm to about 15 mm, or about 9 mm to about 15 mm, or about 10 mm to about 15 mm, or about 0.75 mm to about 12.5 mm, or about 1 mm to about 12.5 mm, or about 1.5 mm to about 10 mm, or about 2 mm to about 10 mm, or about 3 mm to about 9 mm, or about 3 mm to about 8 mm.

Embodiment 13. A method according to any of embodiments 1-12, wherein the fibers have an average linear mass density within the range of about 0.1 denier (D) to about 25 D, e.g., 0.1 D to about 22.5 D, or about 0.1 D to about 20 D, or about 0.1 D to about 17.5 D, or about 0.1 D to about 15 D, or about 0.1 D to about 12.5 D, or about 0.1 D to about 10 D, or about 0.1 D to about 9 D, or about 0.1 D to about 8 D, or about 0.1 D to about 7 D, or about 0.25 D to about 25 D, or about 0.5 D to about 25 D, or about 1 D to about 25 D, or about 1.5 D to about 25 D, or about 2 D to about 25 D, or about 3 D to about 25 D, or about 4 D to about 25 D, or about 5 D to about 25 D, or about 6 D to about 25 D, or about 7 D to about 25 D, or about 8 D to about 25 D, or about 9 D to about 25 D, or about 10 D to about 25 D, or about 12.5 D to about 25 D, or about 15 D to about 25 D, or about 17.5 D to about 25 D, or about 0.25 D to about 22.5 D, or about 0.25 D to about 20 D, or about 0.5 D to about 17.5 D, or about 0.5 D to about 15 D, or about 0.75 D to about 12.5 D, or about 1 D to about 10 D.

Embodiment 14. A method according to any of embodiments 1-13, wherein
the fibers are polymeric (e.g., polyester);
the fibers have an average length within the range of about 0.5 mm to about 15 mm (e.g., about 2 mm to about 10 mm); and
the fibers have an average linear mass density within the range of about 0.1 D to about 25 D (e.g., about 0.5 D to about 15 D).

Embodiment 15. A method according to any of embodiments 1-14, wherein the fibers are present in the sprayable mixture in an amount within the range of about 0.1 wt. % to about 10 wt. %, e.g., about 0.1 wt. % to about 8 wt. %, or about 0.5 wt. % to about 6 wt. %.

Embodiment 16 A method according to any of embodiments 1-14, wherein the fibers are present in the sprayable mixture in an amount within the range of about 1 wt % to about 30 wt %, e.g., about 1 wt % to about 25 wt %, or about 1 wt % to about 20 wt %, or about 1 wt % to about 15 wt %, or about 1 wt % to about 10 wt %, or about 5 wt % to about 30 wt %, or about 5 wt % to about 25 wt %, or about 5 wt % to about 20 wt %, or about 5 wt % to about 15 wt %, or about 10 wt % to about 30 wt %, or about 10 wt % to about 25 wt %, or about 10 wt % to about 20 wt %.

Embodiment 17. A method according to any of embodiments 1-16, wherein the one or more binders of the sprayable mixture are selected from a rubber polymer and a plastic polymer.

Embodiment 18. A method according to embodiment 17, wherein the rubber polymer is a styrene butadiene copolymer.

Embodiment 19. A method according to embodiment 17, wherein the plastic polymer is a polyacrylic or poly(vinyl alcohol) (PVA).

Embodiment 20. A method according to any of embodiments 1-16, wherein the one or more binders of the sprayable mixture includes a starch, e.g., a modified starch.

Embodiment 21. A method according to any of embodiments 1-16, wherein the one or more binders of the sprayable mixture includes a polymeric binder, e.g., selected from polyurethanes, polyacrylates such as poly(methyl methacrylate), poly(ethyl acrylate), poly(butyl acrylate) and poly (acrylic acid), styrene-acrylate copolymers, styrene-ethylene-butadiene-styrene block copolymer (SEBS), poly(vinyl acetate) (PVAc), poly(ethylene-vinyl acetate) (EVA), ethylene-vinyl chloride copolymers, polystyrene, poly vinyl acetate and poly vinyl alcohol.

Embodiment 22. A method according to any of embodiments 1-21, wherein the one or more binders are present in the sprayable mixture in a combined amount within the range of about 0.5 wt. % to about 30 wt. %, e.g., about 0.5 wt. % to about 25 wt. %, or about 0.5 wt. % to about 20 wt. %, or about 0.5 wt. % to about 17.5 wt. %, or about 0.5 wt. % to about 15 wt. %, or about 0.5 wt. % to about 12.5 wt. %, or about 0.5 wt. % to about 10 wt. %, or about 0.5 wt. % to about 9 wt. %, or about 0.5 wt. % to about 8 wt. %, or about 0.5 wt. % to about 7 wt. %, or about 0.75 wt. % to about 30 wt. %, or about 1 wt. % to about 30 wt. %, or about 1.5 wt. % to about 30 wt. %, or about 2 wt. % to about 30 wt. %, or about 3 wt. % to about 30 wt. %, or about 4 wt. % to about 30 wt. %, or about 5 wt. % to about 30 wt. %, or about 7.5 wt. % to about 30 wt. %, or about 10 wt. % to about 30 wt. %, or about 12.5 wt. % to about 30 wt. %, or about 15 wt. % to about 30 wt. %, or about 20 wt. % to about 30 wt. %, or about 0.75 wt. % to about 25 wt. %, or about 0.75 wt. % to about 20 wt. %, or about 1 wt. % to about 17.5 wt. %, or about 1 wt. % to about 15 wt. %, or about 1.5 wt. % to about 12.5 wt. %, or about 1.5 wt. % to about 10 wt. %.

Embodiment 23. A method according to any of embodiments 1-21, wherein the one or more binders are present in the sprayable mixture in a combined amount within the range of about 1 wt % to about 50 wt %, e.g., about 1 wt % to about 40 wt %, or about 5 wt % to about 50 wt %, or about 5 wt % to about 40 wt %, or about 10 wt % to about 50 wt %, or about 10 wt % to about 40 wt %, or about 20 wt % to about 50 wt %, or about 20 wt % to about 40 wt %.

Embodiment 24. A method according to any of embodiments 1-23, wherein the dispersive medium comprises
one or more of a viscosity modifier and a dispersant, present in the dispersive medium in a combined amount within the range of about 0.1 wt. % to about 15 wt. %; and
water, present in the dispersive medium in an amount within the range of about 85 wt. % to about 99 wt. %.

Embodiment 25. A method according to embodiment 24, wherein the viscosity modifier is an anionic or cationic flocculant.

Embodiment 26. A method according to embodiment 24 or embodiment 25, wherein the dispersant is an alkyl amine.

Embodiment 27. A method according to any of embodiments 24-26, wherein the total amount of water, viscosity modifiers, and dispersants is at least about 85 wt. % (e.g., at least about 90 wt. %, or at least about 95 wt. %, or at least about 97.5 wt. %, or at least about 99 wt. %) of the dispersive medium.

Embodiment 28. A method according to any of embodiments 1-27, wherein the total amount of water in the sprayable mixture is in the range of about 20 wt % to about 98 wt %, e.g., in the range of about 20 wt % to about 95 wt %, or about 20 wt % to about 90 wt %, or about 20 wt % to about 80 wt %, or about 20 wt % to about 50 wt %, or about 30 wt % to about 98 wt %, or about 30 wt % to about 95 wt %, or about 30 wt % to about 90 wt %, or about 30 wt % to about 80 wt %, or about 30 wt % to about 50 wt %, or about 40 wt % to about 98 wt %, or about 40 wt % to about 95 wt %, or about 40 wt % to about 90 wt %, or about 40 wt % to about 80 wt %, or about 40 wt % to about 60 wt %.

Embodiment 29. A method according to any of embodiments 1-27, wherein the total amount of water in the sprayable mixture is in the range of about 50 wt % to about 98 wt %, e.g., in range of about 50 wt % to about 95 wt %, or about 50 wt % to about 90 wt %, or about 50 wt % to about 80 wt %, or about 50 wt % to about 70 wt %, or about 60 wt % to about 98 wt %, or about 60 wt % to about 95 wt %, or about 60 wt % to about 90 wt %, or about 60 wt % to about 80 wt %.

Embodiment 30. A method according to any of embodiments 1-27, wherein the total amount of water in the sprayable mixture is in the range of about 70 wt % to about 98 wt %, e.g., in the range of about 70 wt % to about 95 wt %, or about 70 wt % to about 90 wt %, or about 70 wt % to about 80 wt %, or about 75 wt % to about 98, or about 75 wt % to about 95 wt %, or about 75 wt % to about 90 wt %, or about 75 wt % to about 85 wt %, or about 80 wt % to about 98 wt %, or about 80 wt % to about 95 wt %, or about 80 wt % to about 90 wt %, or about 85 wt % to about 98 wt %, or about 85 wt % to about 95 wt %, or about 90 wt % to about 98 wt %.

Embodiment 31. A method according to any of embodiments 1-30, wherein the sprayable mixture further comprises a pigment.

Embodiment 32. A method according to embodiment 31, wherein the pigment is selected from titanium dioxide, zinc oxide, and carbon black.

Embodiment 33. A method according to embodiment 31 or 32, wherein the pigment is present in the sprayable mixture in an amount within the range of about 0.01 wt. % to about 10 wt. %, e.g., about 0.01 wt. % to about 8 wt. %, or about 0.1 wt. % to about 6 wt. %.

Embodiment 34. A method according to any of embodiments 1-33, wherein the sprayable mixture comprises
a plurality of fibers (e.g., polyester fibers) having an average length within the range of about 0.5 mm to about 15 mm and an average linear mass density within the range of about 0.1 D to about 25 D, present in the sprayable mixture in an amount within the range of about 0.1 wt. % to about 10 wt. %;
a binder (e.g., a polyacrylic binder or a PVA binder), present in the sprayable mixture in an amount within the range of about 0.5 wt. % to about 30 wt. %;
a dispersive medium, present in the sprayable mixture in an amount within the range of about 80 wt. % to about 99 wt. %, comprising
one or more of a viscosity modifier and a dispersant, present in the dispersive medium in a combined amount within the range of about 0.1 wt. % to about 15 wt. %; and
water, present in the dispersive medium in an amount within the range of about 85 wt. % to about 99 wt. %.

Embodiment 35. A method according to any of embodiments 1-33, wherein the sprayable mixture comprises
a plurality of fibers (e.g., polyester fibers) having an average length within the range of about 0.5 mm to about 15 mm and an average linear mass density within the range of about 0.1 D to about 25 D, present in the sprayable mixture in an amount within the range of about 0.1 wt. % to about 25 wt. %;
a polyacrylic binder or a PVA binder, present in the sprayable mixture in an amount within the range of about 0.5 wt. % to about 50 wt. %;
a dispersive medium, present in the sprayable mixture in an amount within the range of about 80 wt. % to about 99 wt. %, comprising
one or more of a viscosity modifier and a dispersant, present in the dispersive medium in a combined amount within the range of about 0.1 wt. % to about 15 wt. %; and
water, present in the dispersive medium in an amount within the range of about 85 wt. % to about 99 wt. %.

Embodiment 36. A method according to embodiment 34 or embodiment 35, wherein the sprayable mixture further comprises a titanium dioxide pigment, present in the sprayable mixture in an amount within the range of about 0.01 wt. % to about 10 wt. %.

Embodiment 37. A method according to any of embodiments 1-36, wherein the total amount of the binder, fibers, dispersive medium, and pigment is at least about 85 wt. % (e.g., at least about 90 wt. %, or at least about 95 wt. %, or at least about 97.5 wt. %, or at least about 99 wt. %) of the sprayable mixture.

Embodiment 38. A method according to any of embodiments 1-37, further comprising applying a paint to the outward major surface of the base structure before disposing the sprayable mixture directly against the outward major surface.

Embodiment 39. A method according to any of embodiments 1-38, wherein the coat weight of the disposed mixture before drying is within the range of about 25 g/m² to about 750 g/m², e.g., 25 g/m² to about 650 g/m², or about 25 g/m² to about 550 g/m², or about 25 g/m to about 450 g/m², or about 25 g/m² to about 350 g/m², or about 25 g/m² to about 250 g/m², or about 25 g/m² to about 200 g/m², or about 25 g/m² to about 150 g/m², or about 50 g/m² to about 750 g/m², or about 75 g/m² to about 750 g/m², or about 100 g/m² to about 750 g/m², or about 150 g/m² to about 750 g/m², or about 200 g/m² to about 750 g/m², or about 300 g/m² to about 750 g/m², or about 400 g/m² to about 750 g/m², or about 50 g/m² to about 650 g/m², or about 50 g/m² to about 550 g/m², or about 50 g/m² to about 450 g/m², or about 50 g/m² to about 350 g/m², or about 75 g/m² to about 300 g/m².

Embodiment 40. A method according to any of embodiments 1-38, wherein the coat weight of the disposed mixture before drying is within the range of about 25 g/m² to about 6000 g/m², e.g., about 25 g/m² to about 4000 g/m², or about 25 g/m² to about 2500 g/m², or about 25 g/m² to about 1500 g/m², or about 100 g/m² to about 6000 g/m², or about 100 g/m² to about 4000 g/m², or about 100 g/m² to about 2500 g/m², or about 100 g/m² to about 1500 g/m², or about 500 g/m² to about 6000 g/m², or about 500 g/m² to about 4000 g/m², or about 500 g/m² to about 2500 g/m², or about 500 g/m² to about 1500 g/m², or about 1000 g/m² to about 6000 g/m², or about 1000 g/m² to about 4000 g/m², or about 1000 g/m² to about 2500 g/m².

Embodiment 41. A method according to any of embodiments 1-40, wherein disposing the sprayable composition comprises spraying the composition onto the outward major surface of the base structure with a texture sprayer or a hopper gun.

Embodiment 42. A method according to any of embodiments 1-41, wherein the drying temperature is within the range of about 50° C. to about 200° C., e.g., about 75° C. to about 150° C.

Embodiment 43. A method according to any of embodiments 1-42, further comprising applying a paint to the exterior major surface of the facing layer after drying the disposed mixture.

Embodiment 44. An acoustic panel, made by a method of any of embodiments 1-43.

Embodiment 45. An acoustic panel (e.g., made by a method of any of embodiments 1-43) comprising
  a base structure having one or more edges, an outward major surface having a total area, and an inward major surface opposing the outward major surface, the base structure having independently an NRC of at least about 0.3; and
  a facing layer directly disposed on the outward major surface of the base structure, the facing layer comprising a plurality of fibers and one or more binders, the facing layer having an exterior major surface opposing the outward major surface of the base structure.

Embodiment 46. A panel according to embodiment 45, wherein the base structure comprises a plurality of perforations extending from the outward major surface towards the inward major surface, the plurality of perforations occupying an area of the outward major surface within the range of about 0.1% to about 10% of the total area of the outward major surface, Embodiment 47. A panel according to embodiment 45 or 46, wherein the fibers are polymeric, e.g., polyester, polypropylene, polyethylene, polyethylene terephthalate, polylactic acid, cellulose, polyvinyl chloride, or polyamide.

Embodiment 48. A panel according to embodiment 45 or embodiment 46, wherein the fibers are glass, hemp or flax.

Embodiment 49. A panel according to any of embodiments 45-48, wherein the one or more binders of the sprayable mixture are selected from a rubber polymer (e.g., a styrene butadiene copolymer) and a plastic polymer (e.g., an acrylic polymer).

Embodiment 50. A panel according to any of embodiments 45-49, wherein the facing layer is substantially scattering for light in the wavelength range of 400-700 nm.

Embodiment 51. A panel according to any of embodiments 45-50, wherein the facing layer has an absorption coefficient of less than 0.5 for acoustic frequencies in the range of 100 Hz to 10,000 Hz.

Embodiment 52. A panel according to any of embodiments 45-51, wherein the base structure and the facing layer each independently have an air resistivity, and the air resistivity of the facing layer is equal to or less than the air resistivity of the base structure.

Embodiment 53. A panel according to embodiment 52, wherein the air resistivity of the facing layer is in a range of about 1 to about 2000 kPa·s/m², e.g., about 10 to about 1000 kPa·s/m², or about 100 to about 500 kPa·s/m².

Embodiment 54. A panel according to any of embodiments 45-53, having an NRC of at least about 0.3, e.g., at least about 0.35, at least about 0.4, or at least about 0.45.

Embodiment 55. A panel according to any of embodiments 45-53, having an NRC of at least about 0.5, e.g., at least about 0.6, or at least about 0.7, or at least about 0.8.

Embodiment 56. A panel of any of embodiments 45-55, wherein the NRC of the panel is at least about 70% (e.g., at least about 80%, or at least about 90%, or at least about 95%) of the NRC of the base structure independently.

Embodiment 57. A panel according to any of embodiments 45-56, wherein a thickness of the facing layer is within the range of about 0.25 mm to about 20 mm, e.g., about 0.25 mm to about 15 mm, or about 0.5 mm to about 10 mm.

Embodiment 58. A panel according to any of embodiments 45-57, wherein a width of the panel is within the range of about 12 to about 60 inches, e.g., from 23 to 25 inches or from 46 to 50 inches, and a length of the acoustic panel is within the range of about 12 to about 144 inches, e.g., from 23 to 25 inches or from 46 to 50 inches.

Embodiment 59. A panel according to any of embodiments 45-58, wherein the facing layer comprises fibers in an amount within the range of about 10 wt. % to about 50 wt. %, e.g., about 10 wt. % to about 45 wt. %, or about 15 wt. % to about 40 wt. %.

Embodiment 60. A panel according to any of embodiments 45-59, wherein the facing layer comprises binder and pigment in a combined about within the range of about 40 wt. % to about 90 wt. %, or about 50 wt. % to about 90 wt. %, or about 55 wt. % to about 85 wt. %.

Embodiment 61. A panel according to any of embodiments 45-60, wherein the outward major surface of the base structure comprises a localized paint.

Embodiment 62. A panel according to embodiment 61, wherein the color of the outward major surface is white or black.

Embodiment 63. A panel according to any of embodiments 45-62, wherein the outward major surface of the base structure does not comprise a localized adhesive.

Embodiment 64. A panel according to any of embodiments 45-63, wherein neither of a pigment and an adhesive is localized on the outward major surface of the base structure.

Embodiment 65. A panel according to any of embodiments 45-64, wherein the exterior major surface of the facing layer comprises a localized paint.

Embodiment 66. A panel according to any of embodiments 45-65, wherein the color of the exterior major surface is white or black.

Embodiment 67. A panel according to any of embodiments 45-66, wherein the panel is resistant to sagging.

Embodiment 68. A panel according to any of embodiments 45-67, made by a method according to any of embodiments 1-44.

Embodiment 69. A panel system comprising:
- a plurality of support beams arranged in a support grid so as to form a plurality of grid openings in the support grid; and
- a plurality of panels respectively aligned with the openings of the support grid, the plurality of panels including a first acoustic panel according to any of embodiments 45-68, wherein the first acoustic panel is oriented such that the exterior major surface of the facing layer is facing an interior space adjacent to the support grid.

Embodiment 70. The panel system according to embodiment 69, wherein the panel system is a ceiling system and the support grid is a ceiling grid.

Embodiment 71. The panel system according embodiment 69 or embodiment 70, wherein each of the plurality of panels is an acoustic panel according to any of embodiments 45-68.

We claim:

1. An acoustic panel comprising
a base structure having one or more edges, an outward major surface having a total area, and an inward major surface opposing the outward major surface, the base structure having independently an NRC of at least about 0.3, wherein the base structure comprises a plurality of perforations extending from the outward major surface towards the inward major surface; and
a facing layer directly disposed on the outward major surface of the base structure, the facing layer comprising a plurality of fibers bound by one or more binders, the facing layer having an exterior major surface opposing the outward major surface of the base structure,
wherein the fibers of the facing layer have an average length within the range of about 3 mm to about 15 mm.

2. A panel system comprising:
a plurality of support beams arranged in a support grid so as to form a plurality of grid openings in the support grid; and
a plurality of panels respectively aligned with the openings of the support grid, the plurality of panels including a first acoustic panel according to claim 1, wherein the first acoustic panel is oriented such that the exterior major surface of the facing layer is facing an interior space adjacent to the support grid.

3. The acoustic panel of claim 1, wherein the plurality of perforations occupy an area of the outward major surface of the base structure in the range of about 0.1% to about 10% of the total area of the outward major surface of the base structure.

4. The acoustic panel of claim 1, wherein the facing layer is a dried coating of a sprayed-on mixture comprising a plurality of fibers; one or more binders; and a dispersive medium.

5. The acoustic panel of claim 1, wherein the base structure comprises
one or more of mineral wool, fiberglass, gypsum, wood fiber, paper, cellulose fiber, wet-laid felt, and foam;
one or more fillers; and
one or more binders;
present in the base structure in a combined amount of at least about 85 wt %.

6. The acoustic panel of claim 1, wherein an average depth of the perforations is at least about 3 mm.

7. The acoustic panel of claim 1, wherein the base structure has a thickness within the range of about 2 mm to about 50 mm.

8. The acoustic panel of claim 1, wherein the base structure has independently a noise reduction coefficient (NRC) of at least about 0.5.

9. The acoustic panel of claim 1, wherein the fibers are of polyester, polypropylene, polyethylene, polyethylene terephthalate, polylactic acid, polyvinyl chloride, polyamide, or glass.

10. The acoustic panel of claim 1, wherein the fibers have an average length within the range of about 5 mm to about 12.5 mm and an average linear mass density within the range of about 1 denier (D) to about 25 D.

11. The acoustic panel of claim 1, wherein the fibers are present in the facing layer in an amount within the range of about 10 wt. % to about 50 wt. %.

12. The acoustic panel of claim 1, wherein the one or more binders of the facing layer include one or more binders selected from polyurethanes, polyacrylates, styrene-acrylate copolymers, styrene-ethylene-butadiene-styrene block copolymer (SEBS), styrene-butadiene copolymers, poly(vinyl acetate) (PVAc), poly(ethylene-vinyl acetate) (EVA), ethylene-vinyl chloride copolymers, polystyrene, poly vinyl alcohol and starches.

13. The acoustic panel of claim 1, wherein the one or more binders of the facing layer are present in the facing layer in a combined amount within the range of about 40 wt. % to about 90 wt. %.

14. The acoustic panel of claim 1, wherein the facing layer further comprises a pigment.

15. The acoustic panel of claim 1, wherein the facing layer is substantially scattering for light in the wavelength range of 400-700 nm.

16. The acoustic panel of claim 1, wherein the facing layer has an absorption coefficient of less than 0.5 for acoustic frequencies in the range of 100 Hz to 10,000 Hz.

17. The acoustic panel of claim 1, wherein the base structure and the facing layer each independently have an air resistivity, and the air resistivity of the facing layer is equal to or less than the air resistivity of the base structure and is in the range of about 10 to about 1000 kPa·s/m$^2$.

18. The acoustic panel of claim 1, having an NRC of at least about 0.6.

19. The acoustic panel of claim 1, wherein the NRC of the panel is at least about 90% of the NRC of the base structure alone.

20. The acoustic panel of claim 1, wherein a thickness of the facing layer is within the range of about 0.25 mm to about 10 mm.

21. The acoustic panel of claim 1, wherein
the fibers are present in the facing layer in an amount within the range of about 10 wt. % to about 50 wt. %;
the one or more binders of the facing layer are present in the facing layer in a combined amount within the range of about 40 wt. % to about 90 wt. % and
the facing layer further comprises a pigment.

* * * * *